Nov. 5, 1968  I. A. BOTKACHIK  3,409,073
DEVICE FOR SEALING THE ROTOR OF A REGENERATIVE AIR HEATER
Filed July 27, 1965  2 Sheets-Sheet 1

INVENTOR
Iosif Azasievich Botkachik

BY *[signature]*

ATTORNEYs

Nov. 5, 1968   I. A. BOTKACHIK   3,409,073
DEVICE FOR SEALING THE ROTOR OF A REGENERATIVE AIR HEATER
Filed July 27, 1965   2 Sheets-Sheet 2
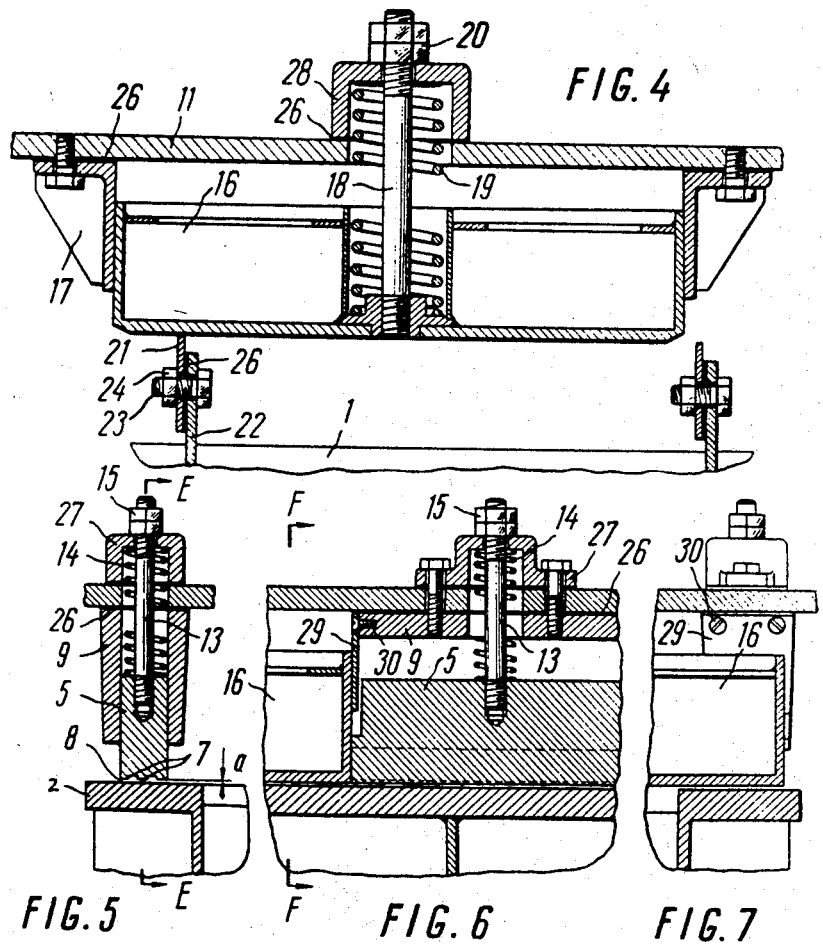
INVENTOR
Iosif Azarievich Botkachik
BY
ATTORNEYS 3,409,073
DEVICE FOR SEALING THE ROTOR OF A
REGENERATIVE AIR HEATER
Iosif Azarievich Botkachik, ulitsa Revprospekt 34/29,
kv. 18, Podolsk, U.S.S.R.
Filed July 27, 1965, Ser. No. 475,203
2 Claims. (Cl. 165—9)

ABSTRACT OF THE DISCLOSURE

An assemblage for sealing the rotor of a regenerative air heater in which blocks are arranged in guides rigidly secured to the end covers of the housing in proximity to the rotor shaft and the periphery of the end faces of the rotor with predetermined gaps relative to the end faces of the rotor for sealing the spaces between the rotor end faces of the covers. Sector plates are arranged in guides also rigidly secured to the end covers and located on the border of the media with predetermined gaps relative to the rotor end faces with each sector plate being defined by two jointly interconnected components. Adjusting means are also provided for adjusting the gaps between the rotor end faces and the covers.

---

Figure 1:
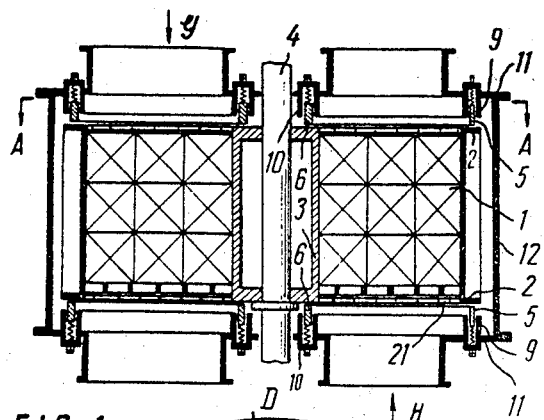

This invention relates to rotating regenerative air heaters, and more particularly to means for sealing the rotor of a regenerative air heater.

Efficiency in the operation of a regenerative air heater depends, to a large extent, on the design of the rotor sealing components. During the operation of an air heater, some air flows into the gas section and is practically wasted taking heat with it. This accounts for the urgency to develop a seal design which ensures the least possible wastage leakage of air.

The conventional seal designs for the rotor of an air heater usually comprise seals located around the rotor flanges and the shaft hub as well as the sector plates facing the rotor ends. The above seals are composed of sheet steel parts such as strips or plates as well as sheet spring steel.

Between the parts of such seals there are, however, large gaps and in addition parts made of sheet spring steel break after short periods of operation due to corrosion, shocks, vibration effects, etc.

Therefore, such seals do not ensure a good separation between the air flows and the gas flows passing through the air heater which results in a large wastage or leakage of heat. An adjustment of the gaps between the rotor and the sealing members is impossible unless the rotor of the air heater is stopped.

Apart from the air wastage, a poor functioning of the air heater seals causes an overloading of the ventilator which delivers cold air, and that of the exhauster which leads to lower the efficiency of the plant as a whole which mounts a regenerative air heater.

An object of this invention is to eliminate the above-mentioned disadvantages.

The principal object of the invention is to provide a device for sealing the rotor of a regenerative air heater which will ensure resistance to corrosion, operation with small gaps and allow such gaps to be adjusted without stopping the rotor thus raising the efficiency of the plant.

These and other objects are accomplished by a device for sealing the rotor of a regenerative air heater comprising seals located about the rotor flanges, the shaft hub and the sector plates arranged at the side of the rotor ends. More particularly, the seals are defined by separate blocks provided with recesses at the ends, which the end surfaces of the rotor forming labyrinth packings therewith; and also closed contours by tightly contacting the sector plates, with the closed contours separating the air flows from the gas flows, and the blocks and sector plates being arranged in guideways provided in the covers of the housing for enabling blocks and sector plates to be adjustable in the direction of the rotor axis thereby reducing the wastage of heated air.

Still more specifically, the blocks and sector plates are provided with pins having adjusting nuts with the pins passing through the springs resting at one end against the block or the plate and at the other end and against the housing. This allows the blocks and sector plates to be locked in the housing in the required position. The pin ends and the adjusting nuts therefore are located outside the housing thus permitting the adjustment of the gaps between the rotor and the sealing members without stopping the rotor.

Figure 2:
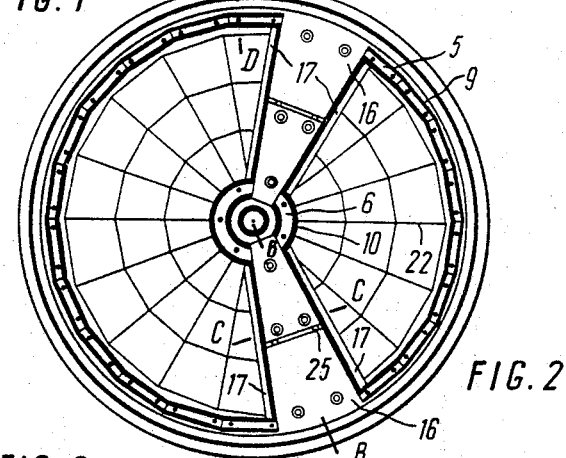
Figure 3:
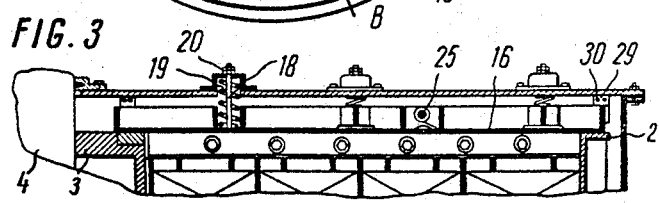

Further objects and advantages of the invention will become more readily apparent to persons skilled in the art from the ensuing detailed description and annexed drawings and in which drawings:

FIGURE 1 is a view partly in elevation and partly in cross-section of an air heater provided with seals according to the invention, FIGURE 2 is a view taken along the line A—A of FIGURE 1, the view looking in the direction of the arrows, FIGURE 3 is a view taken along the line B—B of FIGURE 2, the view being on an enlarged scale, FIGURE 4 is a view taken along the line C—C of FIGURE 2, the view being on an enlarged scale, FIGURE 5 is a view taken along the line D—D of FIGURE 2, the view being on an enlarged scale, FIGURE 6 is a view taken along the line E—E of FIGURE 5, the view looking in the direction of the arrows, and FIGURE 7 is a view taken along the line F—F of FIGURE 6, the view looking in the direction of the arrows.

The device for sealing a rotor 1 of a regenerative air heater comprises seals arranged about flanges 2 of the rotor 1 and hub 3 of a shaft 4 and is defined by blocks 5 arranged around the rotor flanges 2 and blocks 6 arranged around the shaft hub 3.

The blocks 5 and 6 are provided with recesses 7 (FIG. 5) facing the end surface of the rotor 1 and forming labyrinth packings 8 therewith. The blocks 5 and 6 are placed in guide ways 9 and 10 (FIGS. 1, 2, and 5) fastened to upper and lower covers 11 of an air heater housing 12.

The height of all of the blocks 5 and 6 can be adjusted relative to the upper and lower flanges 2 of the rotor 1 to leave the required gap "a" (FIG. 5), and this end is achieved by means of a pin 13, springs 14 and nuts 15 operably related to each block (FIGS. 5 and 6). The blocks 5 and 6 are fitted into the guide ways so that the total gap will not be in excess of 0.5 mm.

In addition to the seals formed by the blocks, provision is made of sector plates 16 (FIGS. 2, 3 and 4) placed in guide ways 17 (FIGS. 2 and 4) and which are adjustable heightwise relative to the flanges 2 of rotor 1 by means of pins 18, springs 19 and nuts 20. The edges of the sector plates 16 rest against the flange 2 of rotor 1 and hub 3 of shaft 4.

The blocks 5 and 6 and their guide ways 9 and 10 are in tight contact with the side surfaces of the sector plates 16 (FIG. 2) while the guide ways 17 are in tight contact with the guide ways 9 and 10 of the blocks. The gap between the sector plates 16 and guide ways 17 does not exceed 0.5 mm.

This arrangement results in the formation of closed contours at both ends of the rotor 1 which serve for the gas (along arrows G) and the air flows (along arrow H) through the air heater (FIG. 1).

The flows of air and of gas are separated in the rotor 1 proper due to radial seals defined by strips 21 attached to radial partitions 22 of the rotor 1 by bolts 23 and nuts 24 (FIGS. 1 and 4). Each strip 21 is flush with the surface of the flange 2 and the surface of the hub 3.

The width of the sector plates 16 is so selected that two radial partitions 22 of rotor 1 with the strips 21 attached thereon be placed therebeneath. As a consequence, one section of the rotor 1 along which the air flows is separated from its other section, along which the gas flows, and thus, with the rotor rotating, one or two sealing strips 21 is always under each sector plate 16.

All the sealing parts, viz blocks 5 and 6, guide ways 9 and 10, as well as the sector plates 16 and the guide ways 17 have the surfaces thereof machined to a surface finish class not less than 5. The foregoing also is applicable to the surfaces of the flanges 2 of rotor 1 and hubs 3 of shaft 4. In addition, the sector plates 16 (FIG. 3) are provided with hinges 25, by means of which the plates can be adjusted depending on the thermal strains of the rotor 1.

All of the joints between the guide ways 9 and 10 and covers 11 of the housing 12 are provided with asbestos spacers 26 (FIG. 5). Similar spacers are also provided under the guide ways 17 of the sector plates 16, below all sealing strips 21, as well as below all caps 27 and 28 which accommodate the springs 14 and 19.

The annular duct between the blocks 5 and 6 and guide ways 9 and 10 in those locations where sector plates are disposed are installed straps 29 fixed with screws 30 (FIGS. 3, 6 and 7).

The working surfaces of the parts are reinforced to ensure a higher corrosion resistance which is of great importance in modern plants which are often supplied with types of fuel having a large content of sulfure.

In operation, all of the blocks 5 and 6 are set so as to abut the end surfaces of the flanges 2, rotor 1 and of hub 3 of the shaft 4, and are locked in such position by means of the nuts 15 and 20 with locking nuts provided on the regulating pins 13 and 18. This mounting ensures a minimum wastage or leakage of air. The section plates 16 are mounted relative to the sealing strips 21 fastened on the rotor with a minimum gap.

The seals can be adjusted with the air heater in operation and the rotor being "hot."

This invention is not to be confined to any strict conformity to the showings in the drawings but changes or modifications may be made therein so long as such changes or modifications mark no material departure from the spirit and scope of the appended claims.

I claim:

1. The combination with a regenerative air heater having a housing provided with open ends, a cover for each open end equipped with inlets and outlets for gas and air media, a rotor within the housing and a shaft for the rotor, means for sealing the rotor against leakage, said sealing means including guide members rigidly connected to each cover in proximity to the shaft and the periphery of the end face of the rotor, respectively, a block mounted in each guide member so as to provide a predetermined gap relative to the end face of the rotor and the sealing means for sealing the space between each rotor end face and each cover, further radial guide members rigidly connected to each cover and located on the border of said media, a separate sector plate arranged between pairs of each said further guide members with a predetermined gap relative to the rotor end face, each sector plate including two parts, and means free to move in a direction normal to said sector plate interconnecting said two parts for pivotal movement therebetween.

2. The combination as claimed in claim 1 including adjusting means operably related to each block and its guide member and each sector plate and its further guide member for adjusting the gap between the rotor end faces and the covers.

References Cited

UNITED STATES PATENTS

| | | | |
|---|---|---|---|
| 2,621,946 | 12/1952 | Jendrassik | 165—9 |
| 2,873,952 | 2/1959 | Mudersbach et al. | 165—9 |
| 3,010,704 | 11/1961 | Egbert | 165—9 |
| 3,250,316 | 5/1966 | Nyberg | 165—9 |

FOREIGN PATENTS

| | | |
|---|---|---|
| 850,598 | 10/1960 | Great Britain. |

ROBERT A. O'LEARY, *Primary Examiner.*

T. W. STREULE, *Assistant Examiner.*